(12) United States Patent
Csak et al.

(10) Patent No.: US 7,490,913 B2
(45) Date of Patent: Feb. 17, 2009

(54) TRAILER AND SEMI-TRAILER BRAKE VALVE WITH AN INTEGRATED CONTROL OF THE AIR SUSPENSION

(75) Inventors: Bence Csak, Budapest (HU); Harro Heilmann, Ostfildern (DE); Andreas Schwarzhaupt, Oberrot (DE); Gernot Spiegelberg, Heimsheim (DE); Armin Sulzmann, Oftersheim (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 10/895,413

(22) Filed: Jul. 21, 2004

(65) Prior Publication Data

US 2005/0162004 A1 Jul. 28, 2005

(30) Foreign Application Priority Data

Jul. 22, 2003 (DE) ................. 103 33 182

(51) Int. Cl.
*B60T 13/74* (2006.01)
(52) U.S. Cl. ................. 303/3; 303/7; 303/123
(58) Field of Classification Search ........ 303/3, 303/7, 123, 119.3; 280/86.5, 6.157, 6.159; 267/64.16
See application file for complete search history.

(56) References Cited

U.S. PATENT DOCUMENTS

| | | | | |
|---|---|---|---|---|
| 5,167,289 A | * | 12/1992 | Stevenson | ............ 177/141 |
| 5,462,342 A | * | 10/1995 | Goebels | ............ 303/113.2 |
| 5,615,931 A | * | 4/1997 | Stumpe et al. | ............ 303/22.1 |
| 6,089,831 A | | 7/2000 | Bruehmann et al. | |
| 6,264,286 B1 | * | 7/2001 | Ehrlich et al. | ............ 303/7 |
| 6,398,236 B1 | * | 6/2002 | Richardson | ............ 280/86.5 |
| 6,540,308 B1 | | 4/2003 | Hilberer | |
| 6,845,989 B2 | * | 1/2005 | Fulton et al. | ............ 280/6.157 |
| 2003/0151222 A1 | * | 8/2003 | Sutton et al. | ............ 280/86.5 |
| 2003/0209276 A1 | | 11/2003 | Hear | |
| 2004/0141853 A1 | | 7/2004 | Duchet et al. | |
| 2004/0145237 A1 | | 7/2004 | Duchet et al. | |

FOREIGN PATENT DOCUMENTS

| | | | |
|---|---|---|---|
| DE | 198 35 638 A1 | | 2/2000 |
| DE | 101 43 888 A1 | | 3/2000 |
| DE | 102 20 791 A1 | | 11/2003 |
| EP | 584829 | * | 3/1994 |
| EP | 0 956 983 A2 | | 11/1999 |
| EP | 1031730 | * | 2/2000 |
| FR | 2 678 867 | | 1/1993 |
| WO | WO 03/008249 A2 | | 1/2003 |
| WO | WO 03/008250 A2 | | 1/2003 |

OTHER PUBLICATIONS

European Search Report dated Nov. 3, 2004.

* cited by examiner

*Primary Examiner*—Bradley T King
(74) *Attorney, Agent, or Firm*—Crowell & Moring LLP

(57) ABSTRACT

An axle arrangement of a trailer or semi-trailer comprises an axle modulator having an axle control unit in which one valve, respectively, is arranged for the service brake and for the air suspension. Such an integrated arrangement simplifies the construction and the mounting of the trailer.

19 Claims, 2 Drawing Sheets

TRAILER AND SEMI-TRAILER BRAKE VALVE WITH AN INTEGRATED CONTROL OF THE AIR SUSPENSION

BACKGROUND AND SUMMARY OF THE INVENTION

The invention relates to an axle modulator of an axle, particularly of a trailer or semi-trailer, having an axle control unit connected to a compressed-air supply.

In the case of trailers or semi-trailers, it is known to construct the service brake system, as a pneumatic power braking system which acts on the front and rear axle of the trailer. When the driver in the towing vehicle operates the service brake system or the no-linkage parking brake system, the braking pulses transmitted by the pressure rise in the brake line actuate a trailer brake valve such that compressed air flows from an air brake reservoir by way of a brake power controller into the brake cylinders of the front axle and rear axle. The input brake pressure is at a defined ratio to the control pressure in the brake line. The brake power controller mechanically regulated by way of the front axle automatically adapts the brake pressure for the front and rear axle of the trailer to the axle load.

In addition, it is known to provide an air suspension on the axle of the trailer or semi-trailer. Air spring valves regulate the air quantity in the air springs corresponding to the loading of the trailer. They thereby have the result that the distance between the trailer body and the road remains the same irrespective of the loading of the trailer. The air suspension is separate from the braking system of the trailer or the semi-trailer. The only contact point is the common compressed-air supply from the towing vehicle by way of jointly utilized compressed-air reservoirs.

It is an object of the invention to provide a fully integrated axle system, which has a simple construction and can be mounted without any special configuration on the frame of the semi-trailer or trailer.

According to the invention, this object is achieved by providing an axle modulator of an axle, particularly of a trailer or semi-trailer, having an axle control unit which is connected to a compressed-air supply. The axle control unit includes a first and a second valve, the first valve controlling a service brake and the second valve controlling an air suspension. Further and advantageous developments are described and claimed herein.

A high degree of integration is achieved as a result of the fact that, according to the invention, a first and a second valve are provided in an axle control unit of an axle modulator of an axle, which axle control unit is connected to the compressed-air supply. The first valve controls a service brake and the second valve controls an air suspension. In contrast to the state of the art, fewer separate components are required, which also saves costs. The trailer or semi-trailer can be produced independently of the tractor vehicle to which the trailer is to be hitched. By means of the axle control unit, the service brake with the ABS function as well as the air suspension can be operated. The axle modulator controls the pressure in the wheel braking devices on both sides of the axle.

The valves of the axle control unit are advantageously controlled electronically. As a result of this measure, only electronic pulses still have to be transmitted from the towing vehicle for triggering the service brake. This control is more reliable than the control by means of the pressure rise in the brake line of transmitted brake pulses. A conventional brake line can therefore be eliminated. An electronic control of the second valve for the air suspension permits a faster reaction to the actual operating conditions of the trailer or semi-trailer.

It is particularly preferable for software to be arranged in the axle modulator for regulating the air suspension. This measure permits the installing of the software together with the axle or the axle modulator. The installation of an additional memory for the software in or on the trailer is not necessary. In particular, the software for regulating the air suspension as well as the software for regulating the antilock system (ABS) can be stored in the axle modulator. As a result, a further integration of the braking system and of the air suspension is achieved, on the one hand. On the other hand, a modular system is created, which can easily be mounted and exchanged. This accelerates the assembly of a trailer.

It is particularly advantageous for the above-described axle modulator to be assigned to each axle arrangement. As a result, the service brake and the air suspension can be controlled and regulated individually for each axle arrangement. An axle system integrated in this manner can easily and rapidly be mounted and wired to the frame of a trailer.

In a preferred further development, a suspension for the axle arrangement is provided, in which suspension the electronic control system for the axle modulator is arranged. It is particularly preferable for the suspension to comprise a hollow U-carrier, in which the electronic control system is arranged. On the one hand, the electronic control system is thereby disposed in a protected manner. On the other hand, it is mounted without additional mounting expenditures together with the axle arrangement on the trailer or semi-trailer.

In a preferred embodiment of the invention, a first sensor system is provided, which is connected with the electronic control system and which detects the actual spring excursion of the entire axle and/or of both wheel sides separately. The actual spring excursion is read-in as a controlled variable. As a function of the determined spring excursion, the second valve for the air suspension can be controlled. When the spring excursion is detected on both wheel sides, a rolling of the trailer can be detected, and a corresponding controlling of the second valve can counteract this rolling.

Preferably, a second sensor system is provided for detecting the coefficients of friction of both wheels of the axle arrangement, which is connected with the electronic control system. On the basis of the measured coefficients of friction, a suitable controlling of the first valve can take place. Particularly, the ABS braking function can be optimized. In the case of a slight difference in the coefficient of friction between the right and the left wheel of an axle, the brake pressure is controlled onto the wheel with the higher adhesion level. Thus, although one wheel locks, the other wheel can convert the full braking power. In this manner, the braking distance can be shortened.

A secure braking of the trailer or of the semi-trailer is ensured in that the compressed-air supply of the axle arrangement includes a compressed-air reservoir.

It is particularly preferable for the compressed-air reservoir to be arranged in the interior of the axle body of the axle. Thus, a separate compressed-air reservoir is assigned to each axle. When the axle is mounted, a respective compressed-air reservoir is therefore also mounted in each case. Furthermore, the provision of a compressed-air reservoir has the advantage that the axles can be braked and sprung independently of one another, and the trailer can also be stopped in the event of a failure of the compressed-air supply.

In a particularly preferred embodiment, an overflow valve is arranged, which has a limited return flow and by way of which the compressed-air reservoir is connected to a pressure supply line. As a result of this measure, the individual axles can communicate with one another because they are connected to a common supply line. However, the overflow valve has the effect that, in the event of a pressure drop in the supply line, a reliable braking of the trailer can still be carried out because sufficient compressed air is stored in the compressed-air reservoir in order to be able to stop the trailer.

A particularly good spring suspension of the trailer is achieved when the air suspension for each wheel includes bellows. Thus, the suspension can be adjusted independently for each side of an axle. In particular, this measure makes it possible to counteract a rolling of the trailer.

Pressure sensors are preferably provided for detecting the internal pressure of the bellows. As a result of this measure, the loading condition of the trailer or semi-trailer can be detected. On the other hand, a load-dependent brake power control can be implemented.

In a particularly preferred embodiment, a valve arrangement is provided, which is connected with the pressure sensors and which, as the internal pressure of the bellows increases, bleeds the bellows and feeds compressed air to lifting bellows. This lifting axle function can be controlled by the second valve of the axle control unit. As the weight decreases, the necessary internal pressure in the air bellows will drop. Starting at a defined threshold, the lifting of the axle will be triggered. In this manner, a constant distance of the frame of the semi-trailer to the ground can be implemented. When the axle is lifted, the air pressure in the bellows is released for the bleeding and the stored pressure fed into lifting bellows, which lift the axle. The valve arrangement advantageously comprises a 4/2 valve.

Embodiments of the invention will be explained in detail by means of the drawings.

DETAILED DESCRIPTION OF THE DRAWINGS

Figure 1:
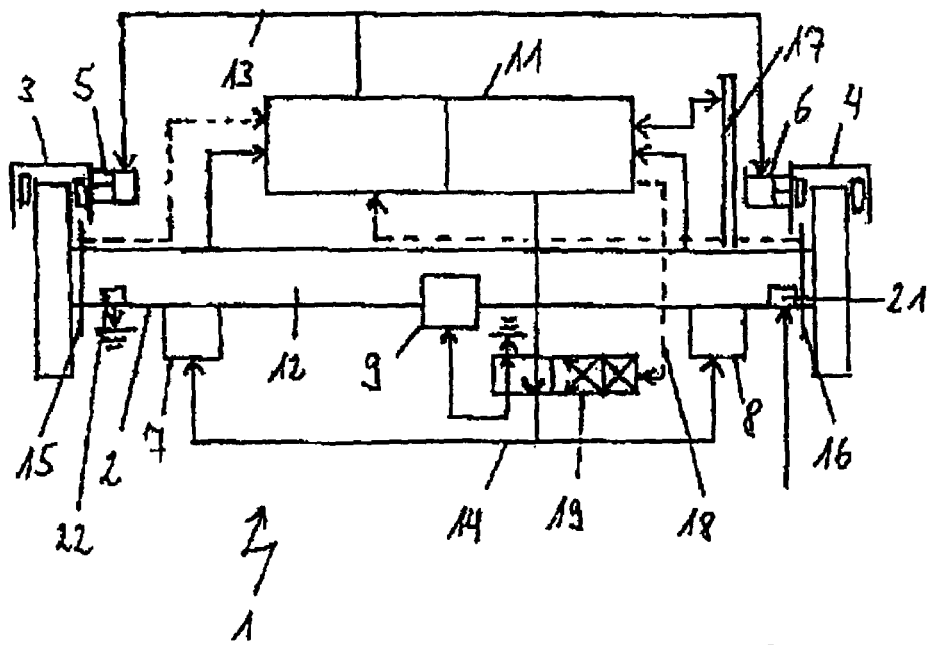
FIG. 1 is a schematic view of a connection diagram of an axle arrangement according to the invention.

FIG. 1 illustrates the connection diagram of an axle arrangement 1 of a trailer or the like. Wheels 3, 4, which can be braked by way of compressed-air-operated wheel brakes 5, 6, are situated on both sides of an axle body 2. Bellows 7, 8, which are acted upon by compressed air and are used for the suspension, are provided on the axle body 2 for each wheel side. Furthermore, lifting bellows 9 are provided, by which the axle body 2 can be lifted or lowered depending on the loading of the trailer.

An axle control unit 11 arranged in an axle modulator is supplied with compressed air by a compressed-air reservoir 12 arranged in the axle body. By way of the brake supply line 13, the axle control unit 11 supplies the wheel braking devices 5, 6 and, by way of the bellows supply line 14, the axle control unit 11 supplies the bellows 7, 8 with compressed air.

The axle control unit 11 controls not only the service brake but also the antilock system (ABS). For this purpose, the speed and the coefficient of friction of each wheel 3, 4 is determined by means of sensors 15, 16. In the event of a slight difference in the coefficient of friction between the right and the left wheel 3, 4 of an axle, the braking pressure is always controlled into the wheel 3, 4 with the higher adhesion level. Thus, although one wheel 3, 4 will lock, the entire brake power can be placed on the other wheel.

By way of the output of the axle control unit 11 for the air suspension, the air suspension and the lifting axle function can be controlled and regulated. The spring excursion of the entire axles, or for each wheel 3, 4, is detected and is read as a controlled variable into a control system. If the spring excursion for both wheels is read-in by means of corresponding sensors 17, a rolling of the trailer can be detected. By measuring the pressure in the bellows 7, 8, the loading condition of the trailer can be detected. As the load decreases, the internal pressure in the bellows 7, 8 required for the suspension will drop. Starting from a definable threshold value, the lifting of the axle will be triggered in that the switching output of the ASR (wheel slip control unit) switch-off valve 18 controls a 4/2-way valve 19 of a valve arrangement. The valve arrangement releases the air pressure in the individual bellows or in the bellows 7, 8 for the bleeding and thus leads the pressure from the output of the axle control unit 11 into the lifting bellows, which causes a lifting of the axle or of the axle body 2. Furthermore, a load-dependent braking power control can be implemented by measuring the pressure in the bellows 7, 8 by the use of pressure sensors (which are not shown).

By way of an overflow valve 21 with a limited return flow, the compressed-air reservoir 12 is connected to a compressed air supply, which all axle arrangements have in common. The overflow valve 21 operates such that, in the event of a pressure drop in the compressed-air supply, the pressure in the compressed-air reservoir 12 is maintained. The compressed-air reservoir 12 has an automatic drain valve 22.

Figure 2:
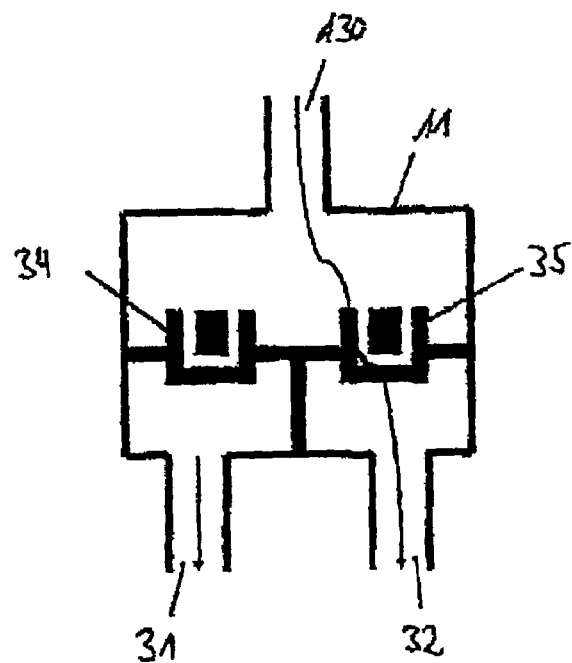
FIG. 2 is a view of an axle control unit of an axle according to the invention.

FIG. 2 contains a detailed view of the axle control unit 11. It has an input 30, by which it is connected to the compressed-air supply, and a first output 31 for the service brake with the ABS function, as well as a second output 32 for the air suspension and the lifting axle function. The output of the compressed air is controlled by way of two electronically controlled valves 34, 35. For the electronic controlling, the axle control unit is connected with a voltage supply and a data line branch. The axle control unit 11 is arranged in an axle modulator, which can also contain the software by which, while taking into account the measured spring excursion and the internal pressure of the bellows, control commands are determined for the valve 35. The control commands for the valve 34 are determined as a function of the determined coefficient of friction of the wheels and of the braking pressure generated in the towing vehicle, in which case the braking pressure can be transmitted from the towing vehicle as a proportional electronic quantity.

Figure 3:
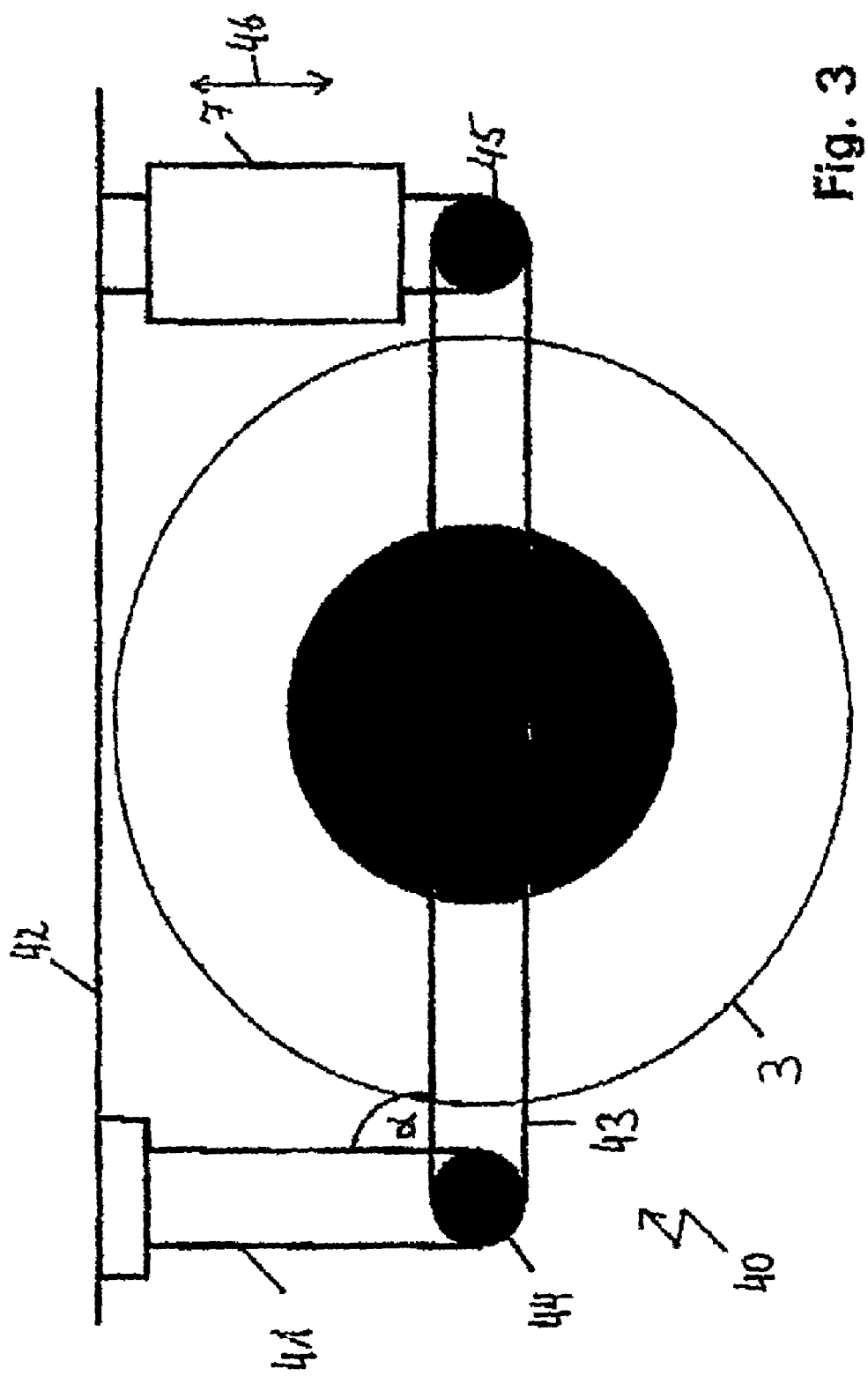
FIG. 3 is a schematic view of the suspension of an axle arrangement.

FIG. 3 is a very schematic view of the suspension 40 of an axle arrangement. A carrier 41, constructed as a hollow U-carrier, is fastened to a frame 42 of a trailer or a semi-trailer. A wheel strut 43 is swivellably arranged at the free end of the carrier 41. The wheel strut 43 is also connected with the frame 42 by way of bellows 7. While point 44 of the wheel strut 43 is arranged in a stationary manner, because of the air suspension, the opposite point 45 is arranged to be swivellable about point 44. A wheel 3 is arranged on the wheel strut 43. The spring excursion of the air suspension can be defined by measuring the angle α between the carrier 41 and the wheel strut 43 or by measuring the length of the spring excursion 46. The electronic control system for the axle modulator is housed in a protected manner in the carrier 41.

An axle arrangement 1 of a trailer or semi-trailer includes an axle modulator with an axle control unit 11 in which, in each case, one valve 34 for the service brake and one valve 35 for the air suspension are arranged. Such an integrated arrangement simplifies the construction and the mounting of the trailer.

The invention claimed is:

1. An integral axle arrangement for fastening to a frame of a trailer or semi-trailer comprising:
   an axle;
   a service brake acting on the axle;
   an air suspension provided on the axle, and
   an axle modulator integral with the air suspension including an axle control unit arranged in the axle modulator integral with the axle and coupleable to a compressed-air supply, and a memory arranged in the axle modulator and storing software adapted to control the air suspension;
   wherein the axle control unit includes a first and a second valve, the first valve controlling the service brake associated with the axle and the second valve controlling the air suspension associated with the axle, wherein the air suspension software is integrated in the axle modulator; and
   wherein only electronic pulses have to be transmitted from a towing vehicle to control the axle control unit.

2. The axle arrangement according to claim 1, wherein the air suspension of the axle arrangement includes a hollow U-carrier, an electronic control system for the axle modulator being arranged in the suspension.

3. The axle arrangement according to claim 2, wherein a first sensor system is provided, which is connected with the electronic control system and which detects an actual spring excursion of at least one of an entirety of the axle body and both wheel sides individually.

4. The axle arrangement according to claim 3, wherein a second sensor system is provided for detecting a coefficient of friction of both wheels of the axle arrangement, which second sensor system is connected with the electronic control system.

5. A trailer or semi-trailer having at least one axle arrangement according to claim 4.

6. The axle arrangement according to claim 1, further comprising a compressed-air reservoir as the compressed-air supply.

7. The axle arrangement according to claim 6, wherein the compressed-air reservoir is arranged in an interior of an axle body of the axle arrangement.

8. The axle arrangement according to claim 7, further comprising:
   an overflow valve with a limited return flow, by way of which the compressed-air reservoir is connected to a pressure supply line.

9. A trailer or semi-trailer having at least one axle arrangement according to claim 8.

10. The axle arrangement according to claim 6, further comprising:
    an overflow valve with a limited return flow, by way of which the compressed-air reservoir is connected to a pressure supply line.

11. A trailer or semi-trailer having at least one axle arrangement according to claim 10.

12. The axle arrangement according to claim 1, wherein the air suspension for each wheel comprises bellows.

13. The axle arrangement according to claim 12, wherein pressure sensors are provided for detecting an internal pressure of the bellows.

14. The axle arrangement according to claim 13, wherein a valve arrangement coupled with the pressure sensors, the valve arrangement being operatively configured to bleed the bellows as the internal pressure of the bellows increases, the valve arrangement being further operatively configured to feed compressed air to lifting bellows for the axle.

15. A trailer or semi-trailer having at least one axle arrangement according to claim 1.

16. An integral axle arrangement for fastening to a frame of a trailer or semi-trailer, comprising:
    an axle;
    a service brake, acting on the axle;
    an antilock system of the service brake;
    and an air suspension, provided on the axle;
    an axle modulator integral with the air suspension including an axle control unit arranged in the axle modulator integral with the axle and coupleable to a compressed-air supply; and
    a memory arranged in the axle modulator storing software adapted to control the air suspension and to control the antilock system; wherein the axle control unit includes a first and a second valve, the first valve controlling the service brake associated with the axle and the second valve controlling the air suspension associated with the axle, wherein the air suspension software and the antilock system software are integrated in the axle modulator, and
    wherein only electronic pulses have to be transmitted from a towing vehicle to control the axle control unit.

17. The axle arrangement according to claim 16, wherein the air suspension of the axle arrangement includes a hollow U-carrier, an electronic control system for the axle modulator being arranged in the suspension.

18. A trailer or semi-trailer having at least one axle arrangement according to claim 16.

19. The axle modulator according to claim 16, wherein the first and second valves of the axle control unit are electronically controlled.

* * * * *